(12) United States Patent
Patterson et al.

(10) Patent No.: US 9,160,171 B2
(45) Date of Patent: Oct. 13, 2015

(54) PRE-PROCESSING OF DATA FOR AUTOMATIC GENERATION CONTROL

(75) Inventors: Anthony Terrence Patterson, Bonney Lake, WA (US); Bradley Thomas Nelson, Kirkland, WA (US)

(73) Assignee: ALSTOM TECHNOLOGY LTD., Baden (CH)

( * ) Notice: Subject to any disclaimer, the term of this patent is extended or adjusted under 35 U.S.C. 154(b) by 697 days.

(21) Appl. No.: 13/489,201

(22) Filed: Jun. 5, 2012

(65) Prior Publication Data

US 2013/0325195 A1 Dec. 5, 2013

(51) Int. Cl.
*H02J 3/00* (2006.01)
*H02J 3/38* (2006.01)

(52) U.S. Cl.
CPC ............ *H02J 3/38* (2013.01); *H02J 2003/007* (2013.01); *Y02E 60/76* (2013.01); *Y04S 40/22* (2013.01)

(58) Field of Classification Search
CPC ...... H02J 3/38; H02J 2003/007; Y02E 60/76; Y04S 40/22
USPC .......................................... 700/286, 291, 295
See application file for complete search history.

(56) References Cited

U.S. PATENT DOCUMENTS

2004/0264083 A1* 12/2004 Mansingh et al. .............. 361/62
2007/0213878 A1* 9/2007 Chen ............................ 700/291
2010/0222935 A1* 9/2010 Forbes et al. .................. 700/291
2012/0310559 A1* 12/2012 Taft ................................ 702/62

OTHER PUBLICATIONS

Hassan Bevrani, et al. Intelligent Automatic Generation Control. c. 2011, CRC PressTaylor and Francis Group, LLC, pp. 1-297, Boca Raton, FL, www.crcpress.com, 2011.
Thomas J. Overbye, How The Power Grid Behaves, Environmental Geosciences, Sep. 1999, vol. 6, Issue 3, pp. 160-161, Article first published online:Aug. 27, 2009, http://onlinelibrary.wiley.com/doi/10.1046/j.1526-0984.1999.08046-32.x/abstract, Last accessed Jun. 7, 2012.

(Continued)

*Primary Examiner* — Mohammad Ali
*Assistant Examiner* — Nathan L Laughlin
(74) *Attorney, Agent, or Firm* — Amin, Turocy & Watson, LLP

(57) ABSTRACT

Systems, methods, and apparatus for pre-processing of electrical power grid data for event-driven automatic generation control (AGC) are presented herein. An AGC application can determine AGC output data, for output to a unit controller that controls power generator(s) related to an electrical power grid, based on current values of a subset of electrical power grid data associated with the electrical power grid that has changed since a prior determination that the electrical power grid data has changed. A pre-process component can determine the subset of the electrical power grid data that has changed since the prior determination, and send the current values of the subset of the electrical power grid data to an area control error component. An event-driven component can determine information in response to an event trigger generated based on processing the current values of the subset of the electrical power grid data received from the pre-process component.

26 Claims, 11 Drawing Sheets

(56) References Cited

OTHER PUBLICATIONS

John McDonald et al., An Electric Power System Tutorial—Part 2 Monitoring and Control of Power Systems, Seminar for legislators and legislative aids, Washington, DC, , Feb. 6, 2004, pp. 1-35,Power Engineering Society and Institute of Electrical and Electronics Engineers, www.ieee.org/portal/cms_docs_pes/pes/ . . . /Blackout_101_part_2.pdf , Last accessed Jun. 7, 2012.

Bingsen Wang, et al. Review of AGC Implementation Issues Before and After Deregulation, Proceedings of 35th North American Power Symposium, Oct. 20-21, 2003, pp. 670-675, Rolla, MO. ,http://www.egr.msu.edu/~bingsen/files/C-naps03.pdf, Last accessed Jun. 7, 2012.

Andres Narvaez, Implementation and Tuning of the Automatic Generation Control in the Energy National Control Center of Ecuador-CENACE, Industrial Electronics and Control Applications, 2005. ICIECA 2005. Date: Nov. 29-Dec. 2, 2005, http://www.researchgatenetpublication/46152926_Implementation_and_Tuning_of_the_Automatic_Generation_Control_in_the_Energy_National_Control_Center_of_Ecuador_-_CENACE , Last accessed Jun. 7, 2012.

Y.L. Karnavas et al., Overall performance evaluation of evolutionary designed conventional AGC controllers for interconnected electric power system studies in a deregulated market environment, International Journal of Engineering, Science and Technology, c. 2010 MultiCraft Limited. All rights reserved, pp. 150-166, vol. 2, No. 3, 2010, http://www.ijest-ng.com/ijest-ng-volt-no3-pp150-166.pdf , http://www.ijest-ng.com/ijest-ng-volt-no3-pp150-166.pdf, Last accessed Jun. 7, 2012.

Lecture 44 and 45 Automatic Generation Control, pp. 1-12, http://www.sari-energy.org/PageFiles/What_We_Do/activities/CEB_Power_Systems_Simulation_Training,_Colombo,_Sri_Lanka/Course_ppts/Lecture_44_45_AGC_1_and_2.pdf, Last accessed Jun. 7, 2012.

R.N. Patel, et. al , Design of a Robust Controller for AGC with Combined Intelligence Techniques, World Academy of Science, Engineering and Technology 45 2008, Jun. 12, 2008, pp. 687-693 , http://waset.org/journals/waset/v45/v45-116.pdf, Last accessed Jun. 7, 2012.

Automation Generation Control (AGC), Smart SCADA, Survalent Technology Corp, Apr. 12, 2012, http://survalent.com/images/pdfs/agc.pdf, Last accessed Jun. 7, 2012.

* cited by examiner

PRE-PROCESSING OF DATA FOR AUTOMATIC GENERATION CONTROL

TECHNICAL FIELD

The subject disclosure relates generally to Energy Management Systems (EMS) for electrical power systems including, but not limited to, pre-processing of data for Automatic Generation Control (AGC).

BACKGROUND

For some general context, in an electrical power system, AGC is a software application for adjusting the power output of multiple generators at different power plants, in response to changes in load and/or power exchanges within a defined Balancing Authority (BA). One of the primary indicators of imbalance is the Area Control Error (ACE), which conventionally is calculated periodically, typically every 4 seconds. Since the electrical power grid needs to balance generation and load closely moment by moment, frequent adjustments to the output of the generators can be implicated.

For one non-limiting example, where the electrical power grid has tie lines, transmission lines interconnecting adjacent control areas, AGC helps to maintain power exchanges over those tie lines at scheduled levels. Within the computer-based EMS, the AGC application can take into account such matters as the most economical units to adjust, the coordination of thermal, hydroelectric, and other generation types, constraints related to the stability of the system and capacity of tie-lines to other electrical power grids, etc. An AGC application is thus used to maintain frequency and/or deviation(s) of power within predetermined operating standards.

However, regardless of whether the data has changed between ACE calculation intervals, conventional AGC systems periodically, e.g., every 4 seconds, poll electrical power grid data, such as data collected by Supervisory Control and Data Acquisition (SCADA) system(s), to make ACE and other calculations based on that data, and send corresponding control signal(s) to power source(s), such as generator(s), to control power generation based on the ACE calculations, e.g., to reduce mismatch between current load and power generation where applicable. However, for example, because all of the electrical power grid data points, such as SCADA data points, handled as inputs to the AGC system are collected and/or processed for ACE or other AGC calculation(s) at every cycle of a periodic AGC processing interval, regardless of whether the electrical power grid data points have changed, a significant and wasteful burden is maintained on processing time and resources of the AGC application.

The above-described deficiencies of today's AGC applications and related technologies are merely intended to provide an overview of some of the problems of conventional technology, and are not intended to be exhaustive, or representative. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In accordance with one or more embodiments, pre-processing of electrical power grid data, e.g., SCADA data, schedule data, etc. within an AGC system is provided in order to identify data points of the electrical power grid data that have changed. For example, various embodiments increase the efficiency of use of available AGC processing resources by pre-processing electrical power grid data to obtain AGC input data representing the data points that have changed for efficient AGC calculations by the AGC applications, such as ACE calculations. In this regard, computations performed by any AGC application can be done in an event driven manner whereby the data points that have changed trigger an event that notifies an AGC application, such as ACE, an economic dispatch (ED) application, a North American Electric Reliability corporation (NERC) application, a reserve application, etc., to process calculations having changed inputs and avoid making calculations where the result has not changed.

In another example, the computations performed by any AGC application can be done in the event driven manner whereby the data points have changed by way of a user input that was manually received via a user interface, such manual entry overriding one or more current values of electrical power grid data and thus triggering an event that notifies the AGC application, such as ACE, the ED application, the NERC application, the reserve application, etc. to process calculations having changed inputs.

In addition, it is noted that any event-driven mechanism, e.g., triggering based on observing what has changed, described herein as applicable to the pre-processing component can further apply to any output of any AGC application to enable downstream event-driven behavior. For instance, as AGC output data changes, control signaling for power generation can be changed in an event-driven manner as well, i.e., changes in the AGC output data can be identified as they affect a given control signal, and the given control signal can be altered or generated as the need is dictated by event triggers.

Moreover, optionally, as an alternative to event-driven AGC processing, or for a subset of computations co-existing with event-driven processing, computations performed by the AGC applications can also be performed periodically based on the data points that have changed since a previous cycle.

For instance, as an example AGC application, the AGC input data can be presented, directed, etc. to ACE for computation of ACE values at ACE processing cycles, intervals, etc. Alternatively, computation of ACE values can be done in an event driven manner whereby the data points that have changed trigger an event that notifies ACE to process certain calculations having changed inputs. As such, various embodiments disclosed herein can significantly reduce AGC processing of electrical power grid data during AGC processing. AGC pre-processing of electrical power grid data points thus identifies changes of such data points and delivers them as they occur to the AGC components as applicable to calculations by the AGC components that are affected by the changes, thereby avoiding calculations based on unchanged data points of the electrical power grid data points.

In one embodiment, a system includes a pre-process component configured to determine a subset of electrical power grid data associated with an electrical power grid that has changed since a prior determination that at least some of the electrical power grid data has changed. The system further includes an AGC application configured to receive current values of the subset of the electrical power grid data and determine AGC output data based on the current values of the subset of the electrical power grid data.

For instance, ACE is a calculated value of the AGC application that determines the control output data to be issued to a generating unit controller, i.e., the device at the power plant that controls the physical electrical generator(s) related to an electrical power grid, based on current values of a subset of electrical power grid data associated with the electrical power grid that has changed since a prior determination that the electrical power grid data has changed. Further, a pre-process component can determine the subset of the electrical power grid data that has changed since the prior determination, and send the current values of the subset of the electrical power grid data to an AGC application, such as ACE.

In another embodiment, the pre-process component can determine the subset of the electrical power grid data that has changed based on a predetermined magnitude with respect to whether a given change for a respective electrical power grid data point constitutes a significant change that is included in the subset or constitutes an insignificant change that is not included in the subset.

In yet another embodiment, the pre-process component can determine whether the given change for the respective electrical power grid data point constitutes a change based on an analysis of a predefined number of significant digits. For a non-limiting example, the significant change can include a change that is less than four decimal places of precision associated with the respective electrical power grid data point; and the insignificant change can include another change that is greater than the four decimal places of precision. In such example, 0.3555267 changing to 0.3555271 would not be considered a significant change whereas 0.3555267 changing to 0.3559871 would be considered significant because the fourth significant digit has changed in the latter example.

In one or more example embodiments, the electrical power grid data can indicate a power flow of a tie line of the electrical power grid, a frequency of the electrical power grid, an output associated with a power source of the electrical power grid (e.g., a generating unit), and/or an output associated with a virtual power plant of the electrical power grid. Further, the electrical power grid data can indicate a net schedule of tie line power associated with the tie line or a net schedule of generated power associated with the power source.

Furthermore, an AGC application can identify a dependency between a set of calculations to be performed by the AGC application based on at least part of the subset of the electrical power grid data and a dependent set of calculations previously performed by the AGC application. Based on identifying the dependency, the AGC component can perform the set of calculations to determine current values and efficiently update a result computed by the AGC application based on the current values of the set of calculations and the previously performed, dependent set of calculations, without re-computing the previously performed set of calculations. For example, the AGC application can determine a summation of power flows of a group of tie lines of the electrical power grid based on the subset of electrical power grid including a changed value with respect to power flow of a tie line of the group of tie lines, and based on the dependency of the changed value to previously computed values of the summation, re-compute the summation of power flows for the group efficiently based on the changed value and the previously computed values.

In yet another embodiment, the pre-process component can employ a damping delay function to delay a calculation using part(s) of the subset of the electrical power grid data for a predetermined period of time based on a probability that a batch of changes, which are dependent on one or more of the current values of the subset of the electrical power grid data, will be received within the delay time period. For example, the pre-process component can delay a summation of values of the electrical power grid data, the summation including one or more of the current values of the subset of the electrical power grid data being summed, based on the probability that at least some of the values associated with the summation will change and be received within the predetermined period of time. Use of the damping delay function is not limited to calculations using the electrical power grid data. It is also noted that the delay function can apply to delaying any calculations which are based upon the output of other calculations to allow the other calculations to reach a stable point for completing the calculations that depend on the other calculations within the predetermined period of time.

In another example, an analytic component can modify the predetermined period of time used by the damping delay function for a given calculation based on a user-defined input or by an analysis of historical change data, such as change rates or sizes, for the various inputs to one or more stages of the given calculation.

As mentioned, the techniques described herein can be applied to any of the applications within an AGC system. Accordingly, in one embodiment, a North American Electric Reliability corporation (NERC) component can determine NERC information utilizing the current values of the subset of the electrical power grid data. Furthermore, a power reserve calculation component can be triggered in response to an event trigger generated as a result of processing the current values of the subset of the electrical power grid data. In another embodiment, an economic dispatch (ED) component can calculate unit control targets in response to an event trigger generated as a result of processing the current values of the subset of the electrical power grid data, or during a periodic ED processing cycle.

More generally, any AGC application can be an event-driven component, e.g., ACE component 120, NERC component 310, reserve component 320, ED component 330, etc. can determine information in response to an event trigger generated as a result of processing the current values of the subset of the electrical power grid data received from the pre-process component.

In one non-limiting implementation, a method can include determining, by an EMS system including at least one processor, a subset of electrical power grid data associated with an electric power grid that has changed since a prior determination at least some of the electrical power grid data has changed. Based on changed values represented in the subset of the electrical power grid data, the method can further include determining AGC data based on the subset of the electrical power grid data.

In an embodiment, determining the subset of the electrical power grid data that has changed further includes determining, based on respective predetermined precision levels applied for respective values of the electrical power grid data, whether a given data point of the electrical power grid data has changed in response to polling a current value of the given data point. An alternative to polling that can be used as mentioned above is data change event notification. With event notification of data changes, events are issued by the pre-process component (or any AGC system component) based on a given set of changes to a subset of the electrical power grid data satisfying a set of eventing conditions, and when an event condition is satisfied, the given set of changes are issued to the applicable AGC component to handle the applicable computations based on the given set of changes and notification that event condition has been satisfied.

In another embodiment, determining the subset of the electrical power grid data that has changed further includes determining, based on respective predetermined precision levels applied for respective values of the electrical power grid data, that a given data point of the electrical power grid data has changed in response to a new value received for the given data point replacing a previous value.

In yet another embodiment, the method can include, in response to identifying a dependency between a set of calculations to be performed based on at least some of the subset of the electrical power grid data and a dependent set of calculations previously performed by the AGC application. Based on identifying the dependency, the AGC component can perform the set of calculations to determine current values and efficiently update a result computed by the AGC application based on the current values of the set of calculations and the previously performed, dependent set of calculations, without re-computing the previously performed, dependent set of calculations.

In one embodiment, the processing can include delaying the calculation using the subset of the electrical power grid data or other inputs for a predetermined period of time to accommodate a receipt of a batch of changes related to one or more of the changed input values.

In another non-limiting implementation, a computer-readable storage medium comprising instructions that, in response to execution, cause a system including at least one processor to perform operations, comprising receiving a subset of changed values of electrical power grid data associated with an electrical power grid determined to have changed relative to previous values of the electrical power grid data, and based on the subset of changed values, determining AGC data based on a subset of the electrical power grid data.

In an embodiment, a dependency is recognized of a first computation associated with a changed value and a second computation that preceded the first computation. Based on recognition of the dependency, a result based on the dependency is computed based on the first computation and previously computed values of the second computation.

In one or more other embodiments, the method can include, in response to an event trigger generated as a result of processing the subset of the changed values or during a periodic processing cycle, determining NERC information utilizing the subset of the changed values; generate current available reserve information and compare to the reserve requirement; and/or generating ED information based on the subset of the changed values.

In one embodiment, the method can include delaying calculations associated with at least a portion of the electrical power grid data for a predetermined period of time in response to receiving at least one changed value to allow additional values to change related to at least some of the portion of the electrical power grid data prior to the determining the ACE data.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Conventional AGC systems process, poll, retrieve, compute, etc. a large number of data points, inputs, etc. corresponding to information of an electrical power grid during every ACE processing cycle, interval, etc. As such, conventional AGC systems waste valuable computing resources by re-computing the large number of inputs, e.g., 500,000 SCADA inputs, without considering whether portion(s) of the information of the electrical power grid has remained unchanged between the ACE processing intervals.

Various non-limiting embodiments of systems, methods, and apparatus presented herein increase efficiency of use of available AGC processing resources by implementing AGC pre-processing of electrical power grid data that identifies changes to the data prior to processing by various AGC processing components so that the various AGC processing components can avoid expensive calculations associated with data that has not changed, e.g., based on triggers associated with the identified changes of such data that initiate respective calculations by the various AGC processing.

Figure 1:
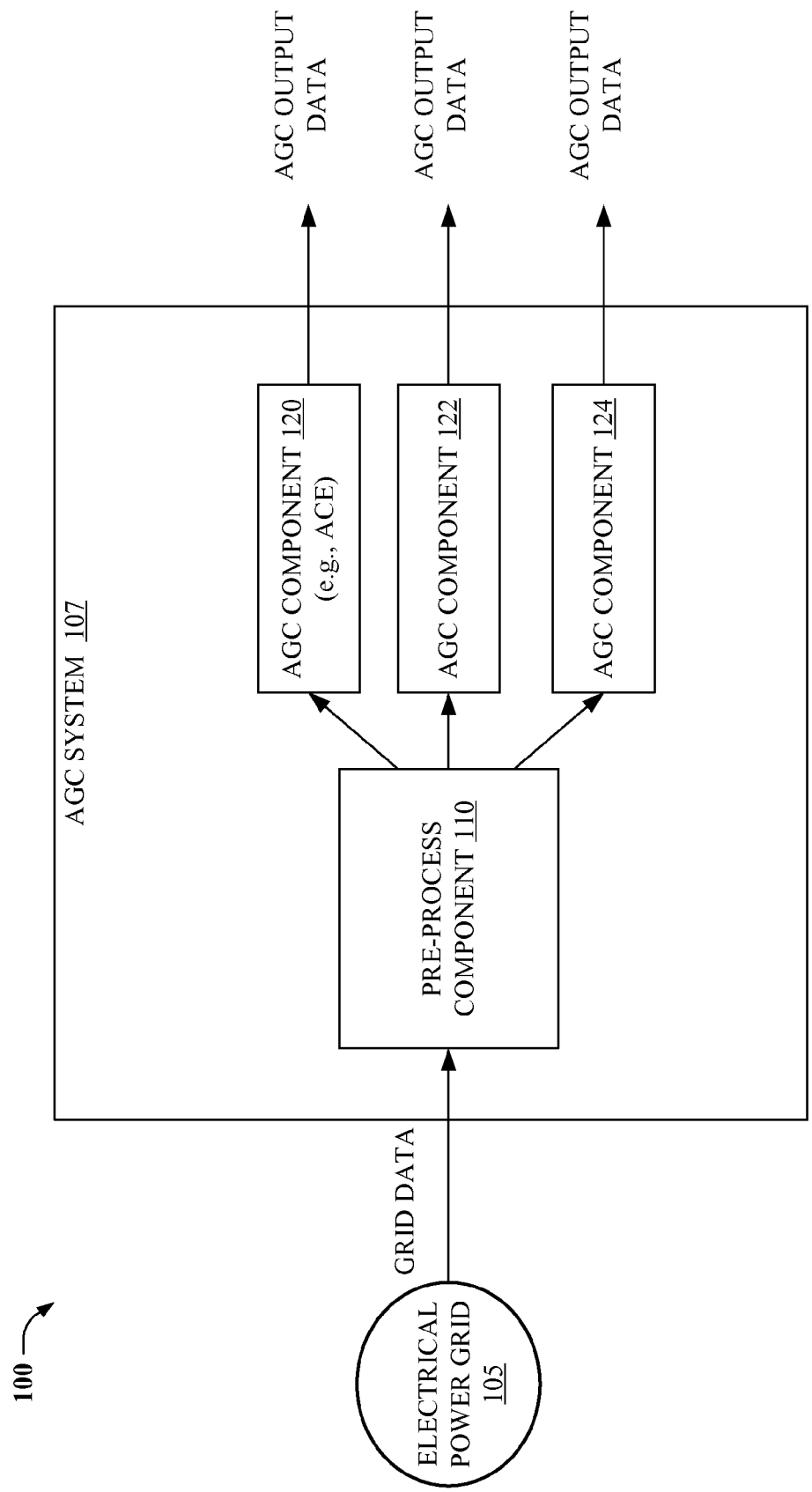
FIG. 1 illustrates a block diagram of an automatic generation and control (AGC) infrastructure, in accordance with an embodiment.

Referring now to FIG. 1, a block diagram of AGC infrastructure 100 is illustrated, in accordance with an embodiment. Aspects of AGC infrastructure 100, other infrastructures, systems, networks, apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

AGC infrastructure 100 can include AGC system 107 communicatively coupled to electrical power grid 105. Electrical power grid 105 can include an electrical grid (not shown), e.g., an interconnected network for delivering electricity from suppliers to consumers, etc. via respective tie lines, or transmission lines. The suppliers can include a power source, a power plant, a power station, a generator, a virtual power plant, a power authority, a utility, etc. that can deliver the electricity to consumers, loads, etc. via the tie lines.

AGC system 107 can include a pre-process component 110 and various AGC components, e.g., ACE component 120, AGC component 122, and AGC component 124. Such components can be associated with respective AGC applications that can perform calculations in an event driven manner whereby pre-process component 110 can identify data points, e.g., grid data, of electrical power grid 105 that have changed, triggering an event that notifies the respective AGC applications to process calculations having changed inputs. In other embodiment(s), as an alternative to event-driven AGC processing, the respective AGC applications, or a subset of such applications, can, as an alternative to event-driven AGC processing, or for a subset of computations co-existing with event-driven processing, periodically perform calculation(s) based on the data points that have changed since a previous cycle.

For instance, AGC input data can be presented, directed, etc. to AGC component 120, e.g., ACE, for computation of ACE values at ACE processing cycles, intervals, etc. Alternatively, AGC component 120 can compute the ACE values in an event driven manner, whereby pre-process component 110 can identify changed data points and trigger an event that notifies AGC component 120 to process certain calculations having changed inputs. As such, various embodiments disclosed herein can significantly reduce AGC processing of electrical power grid data during AGC processing. Pre-process component 110 thus identifies changes of such data points and delivers them, e.g., to AGC component 120, 122, 124, etc. as they occur, e.g., as applicable to calculations by such components that are affected by the changes, thereby avoiding calculations based on unchanged data points of the electrical power grid data points.

As illustrated by FIG. 1, pre-process component 110 can determine a subset of electrical power grid data associated with electrical power grid 105 that has changed since a prior determination that at least some of the electrical power grid data has changed. Further, AGC application(s) associated with respective AGC components, e.g., 120, 122, 124, etc. can receive current values of the subset of the electrical power grid data from pre-process component 110 and determine AGC output data based on the current values of the subset of the electrical power grid data.

Figure 2:
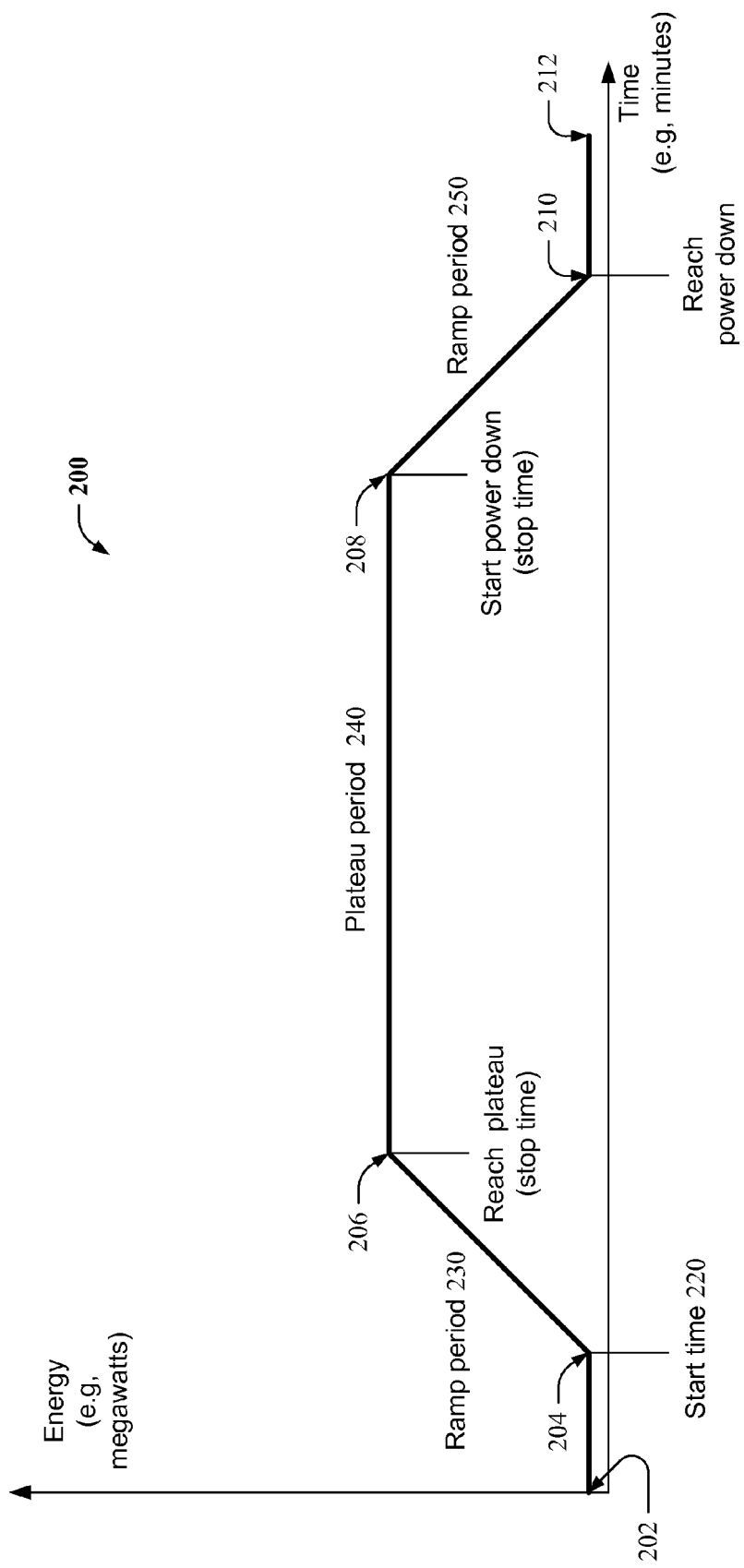
FIG. 2 illustrates a block diagram of a schedule profile, in accordance with an embodiment.

Referring now to FIG. 2, a block diagram of a schedule profile 200 including six time/value pairs (202, 204, 206, 208, 210, and 212) is illustrated, in accordance with an embodiment. Schedule profile 200 is representative of electrical power grid data, e.g., schedule data, which defines units of energy (e.g., megawatts) scheduled to be output from a power plant of power grid 105. Such schedule data can be cyclically received from a schedule data server, e.g., received once per hour, received less often, etc. As illustrated by FIG. 2, schedule profile 200 includes a start time 220 defined by time/value pair 204, a ramp period 230 defined by time/value pairs 204 and 206, a plateau period 240 defined by time/value pairs 206 and 208, e.g., a stop time, and a ramp period 250, e.g., associated with power down of the power plant, defined by time/value pairs 208 and 210. For some non-limiting example time periods, ramp periods 230 and 250 can be about 10 minutes, and plateau period 240 can be about 40 minutes. Further, in one or more embodiments, schedule profile 200 can be utilized to schedule power exchange(s) between Balancing Authorities across respective tie lines of power grid 105.

During ramp periods 230, 250, etc., it is known that data will be changing rapidly, and so frequent calculations will be made by AGC system 107 as a result of the change-driven events that occur, e.g., AGC system 107 can trigger computation of AGC related data, via pre-process component 110, upon detection of triggers that are associated with changes of data. In turn, during the plateau period, it is known that the data will either not change at all or infrequently, and so fewer or no change driven events will be received for processing by the AGC applications. Thus, unlike conventional AGC systems that waste computing resources by performing AGC related calculations, e.g., schedule data related calculations, during times in which schedule data doesn't change, e.g., during plateau period 240, AGC system 107 can identify data points that have changed, and trigger an event that notifies respective AGC applications to process calculations having changed inputs.

Schedule data can also be itself used to proactively generate events because it will be known that little to no processing will be required during the plateau period. For instance, for schedule profile 200, an event can be defined based on identifying the end of the ramp period 230 signifying the beginning of the plateau period 240 during which the AGC system 107 can stop processing applicable data related to that schedule because the data is not changing.

Referring again to FIG. 1, in one or more embodiments, computation(s) performed by respective AGC applications associated with AGC component(s), e.g., 120, 122, 124, etc., can be done in the event driven manner whereby the data points have changed by way of a user input that was manually received via a user interface (see below). Such manual entry can override current value(s) of electrical power grid data, which would similarly trigger an event that notifies the respective AGC applications, e.g., ACE, an ED application (see below), a NERC application (see below), a reserve application (see below), etc. to process calculations having changed inputs. Accordingly, any change to the data processed by the AGC applications, however received by AGC system 107, can trigger an event that an AGC application can interpret to begin a processing task with respect to the event.

Further, the AGC application(s) can determine control output data to be issued to a generating unit controller, e.g., a device at a power plant that controls physical electrical generator(s) electrically coupled to power grid 105, based on current values of a subset of electrical power grid data associated with electrical power grid 105 that has changed since a prior determination that the electrical power grid data has changed.

In one or more embodiments, the electrical power grid data can include SCADA data, schedule data, etc. Telemetered data, for example, is received by AGC system 107 via SCADA. Schedule data for the power transactions can be received by AGC system 107 via a data interface (not shown) of AGC system 107. In some embodiment(s), the schedule data can be received from SCADA and/or other sources/routes associated with power grid 105. As non-limiting examples, SCADA system data can indicate a power flow of a tie line of the electrical power grid 105, a frequency of the electrical power grid 105, an output associated with a power source of electrical power grid 105, and/or an output associated with a virtual power plant of electrical power grid 105. In other embodiment(s), the schedule data can indicate information associated with scheduled power transaction(s), e.g., exchange(s) of power between BAs across respective tie lines of the power grid 105.

In another embodiment, pre-process component 110 can determine the subset of the electrical power grid data that has changed based on a predetermined precision level with respect to whether a given change for a respective electrical power grid data point constitutes a significant change that is included in the subset or constitutes an insignificant change that is not included in the subset, e.g., utilizing one or more "result change thresholds". In an embodiment, pre-process component 110 can determine whether the given change for the respective electrical power grid data point constitutes a significant or insignificant change based on an analysis of a magnitude, or absolute value, of the given change. For example, the significant change can include the given change being greater than or equal to a predetermined amount, or size, of change; and the insignificant change can include the given change being less than the predetermined amount of change.

In another example, pre-process component 110 can determine whether the given change for the respective electrical power grid data point constitutes a significant or insignificant change based on an analysis of a predefined number of significant digits for the given change. For example, the significant change can include a change that is less than four decimal places of precision associated with the respective electrical power grid data point; and the insignificant change can include another change that is greater than the four decimal places of precision. In such example, 0.3555267 changing to 0.3555271 would not be considered a significant change whereas 0.3555267 changing to 0.3559871 would be considered significant because the fourth significant digit has changed in the latter example.

In one embodiment, an AGC application can identify a dependency between a set of calculations to be performed by the AGC application based on part(s) of the subset of the electrical power grid data and a dependent set of calculations previously performed by the AGC application. For instance, this might happen where an AGC application computation first calculates a result, which is then used as an input to another computation with other inputs as well, and so on for third, fourth operations representing cascading calculations to achieve an end result. In this regard, based on identifying the dependency, the AGC application can perform the set of calculations to determine current values and efficiently update a result computed by the AGC application based on the current values of the set of calculations and the previously performed, dependent set of calculations, without re-computing the previously performed set of calculations. For example, the AGC application can determine a summation of power flows of a group of tie lines of the electrical power grid based on the subset of electrical power grid including a changed value with respect to power flow of a tie line of the group of tie lines, and based on the dependency of the changed value to previously computed values of the summation, re-compute the summation of power flows for the group efficiently based on the changed value and the previously computed values.

In yet another embodiment, pre-process component 110 can employ a damping delay function to delay a calculation of part(s) of the subset of the electrical power grid data for a predetermined period of time based on a probability that a batch of changes, which are dependent on one or more of the current values of the subset of the electrical power grid data, will be received within the predetermined period of time. For example, pre-process component 110 can delay a summation of values of the electrical power grid data, the summation including one or more of the current values of the subset of the electrical power grid data being summed, based on the probability that at least some of the values associated with the summation will change and be received within the predetermined period of time. It is noted that use of the damping delay function is not limited to calculations using the electrical power grid data—the delay function can apply to delaying any calculations which are based upon the output of other calculations to allow the other calculations to reach a stable point for completing the calculations that depend on the other calculations within the predetermined period of time.

For another example, pre-process component 110 can delay, in response to receiving a change of an electrical power grid data point of a set of related electrical power grid data points, sending the subset of the electrical power grid data to an AGC application, e.g., associated with AGC component(s) 120, 122, 124, etc. for a predetermined period of time to enable a set of changes related to the set of the related electrical power grid data points to be identified by pre-process component 110 and included in the subset that is sent to the AGC application In another embodiment, an AGC component, e.g., 120, 122, 124, etc. can delay performing a set of computations based on the subset of the electrical power grid data for a predetermined period of time to enable a set of changes of the electrical power grid data related to the set of computations to be received by an associated AGC application.

In yet another embodiment, pre-process component 110 can delay a summation of values of the electrical power grid data, the summation including at least one of the current values of the subset of the electrical power grid data being summed For example, pre-process component 110 can delay calculation of a sum of power flows of a group of tie lines for a predetermined period of time in response to detection of a change in power flow of one of the tie lines of the group of tie lines. As such, pre-process component 110 can allow for values of power flows of other tie lines of the group of tie lines to settle, and/or allow for processing of updates to the values of the power flows of the other tie lines to be completed, etc. before computing the sum of the power flows. Accordingly, computing resources of AGC system 107 can be further preserved, e.g., so that the sum of tie line values is not re-computed upon detection of changes of power flow of contributing tie lines occurring, for example, within milliseconds of each other.

Figure 3:
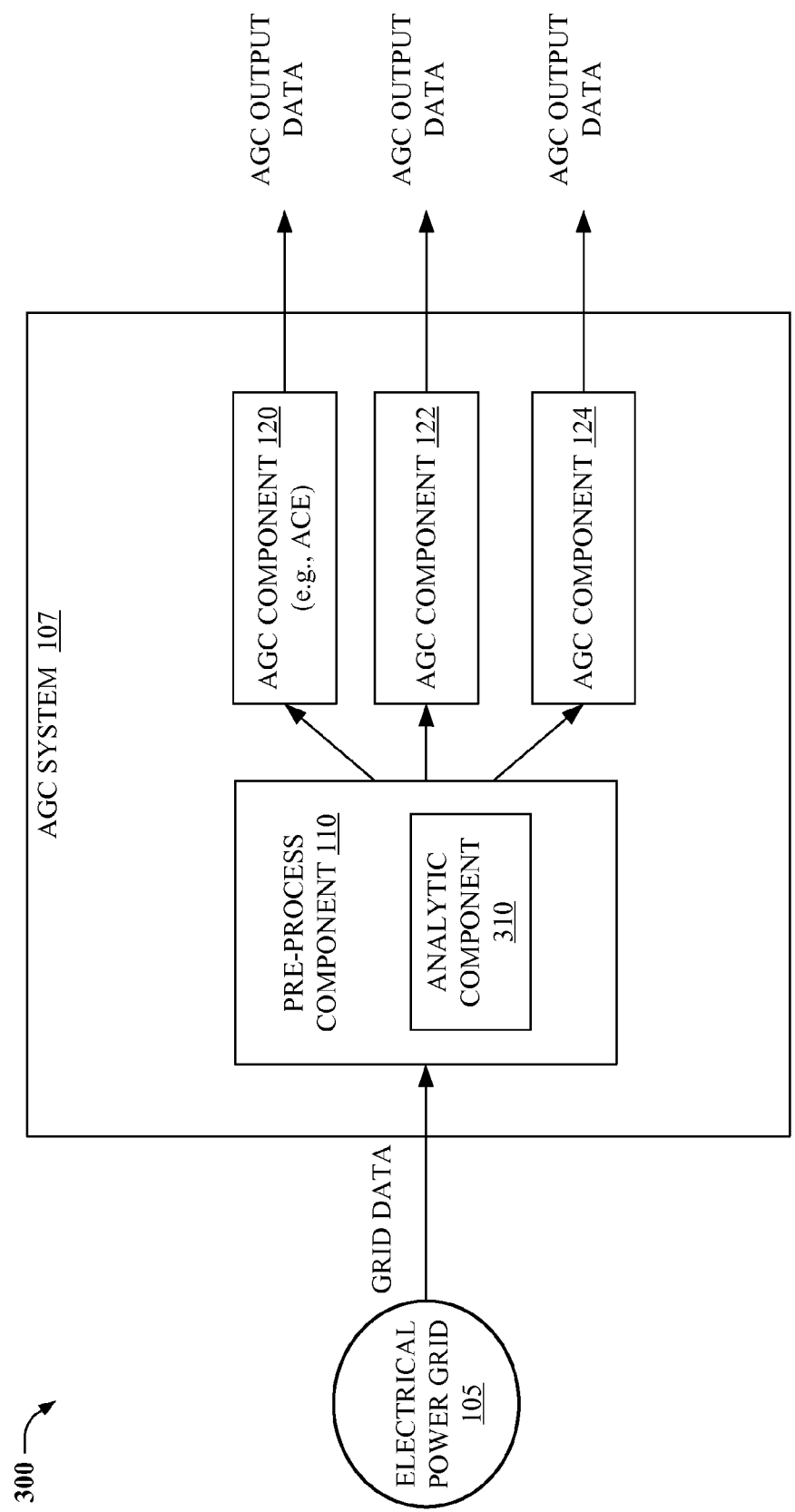
FIG. 3 illustrates a block diagram of an AGC system including an analytic component, in accordance with an embodiment.

Now referring to FIG. 3, a block diagram 300 of an AGC system 107 including an analytic component 310 is illustrated, in accordance with an embodiment. In an embodiment, analytic component 310 can modify the predetermined period of time used by the damping delay function for a given calculation based on a user-defined input, e.g., received via a user interface (see below), or by an analysis of historical change data, such as change rates or sizes, for the various inputs to one or more stages of the given calculation. For example, analytic component 210 can modify the predetermined period of time based on the user-defined input utilizing a manual entry 'trial and error' approach, e.g., associated with a "performance test", for setting the predetermined period of time based on amount of processing, computation, etc. performed by AGC system 107. For example, the performance test can indicate a size of the delay that will reduce the amount of processing.

In another embodiment, pre-process component 110 can determine dependencies of respective computations associated with the electrical power grid data on other computations. Further, pre-process component 110 can process the respective computations in response to processing the other computations, e.g., based on detections of respective triggers associated with the other computations corresponding to respective changes of the electrical power grid data. For example, pre-process component 110 can perform a second computation, e.g., filtering, data smoothing, etc. on a result of a calculation of the sum of power flows, e.g., in response to a change of power flow of the tie line of the group of tie lines.

Figure 4:
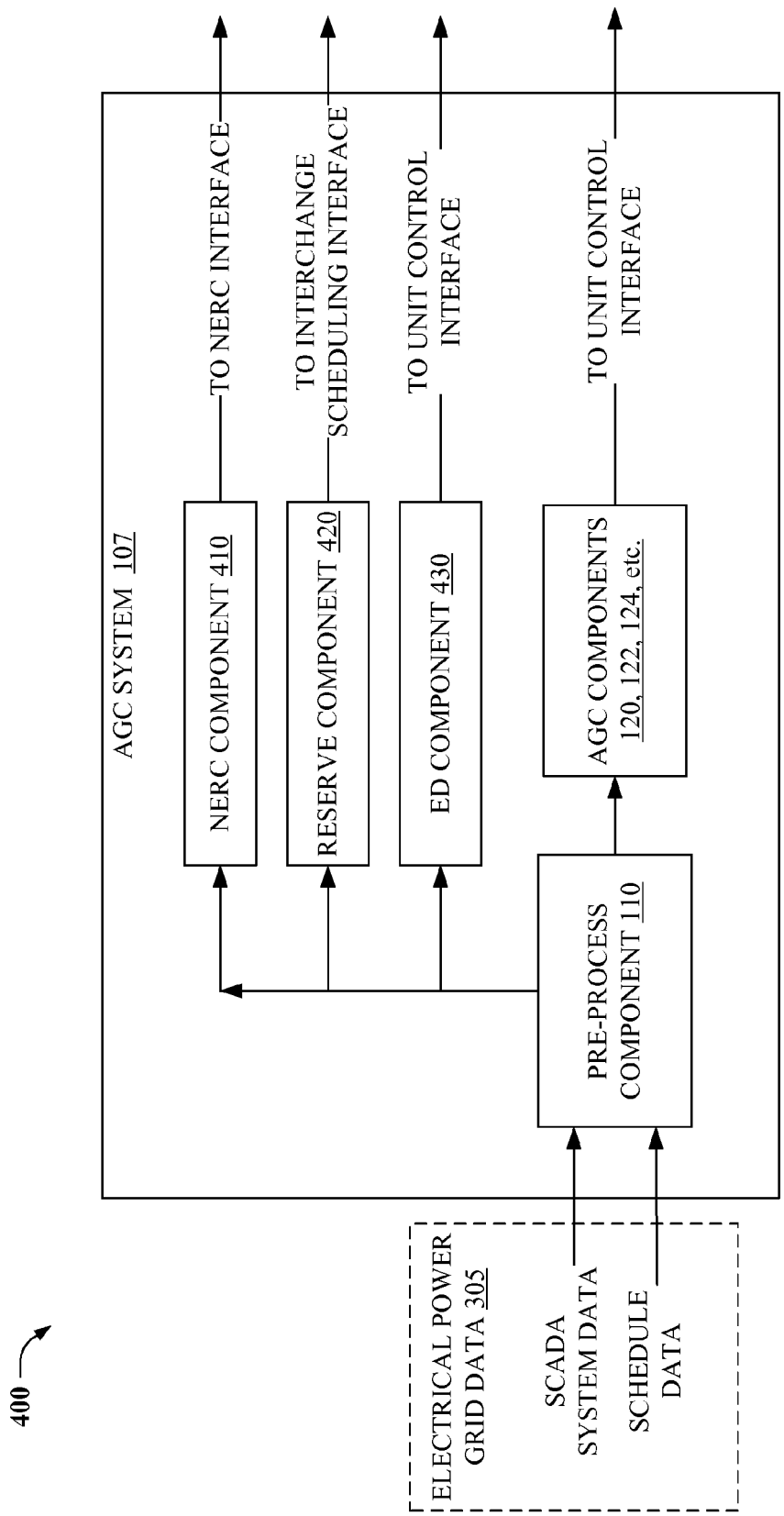
FIG. 4 illustrates a block diagram of another AGC system, in accordance with an embodiment.

As mentioned, the techniques described herein can be applied to any AGC application. Accordingly, in one or more embodiments illustrated by FIG. 4, a North American Electric Reliability corporation (NERC) component 410 can determine NERC information utilizing the current values of the subset of the electrical power grid data. Furthermore, a power reserve calculation component 420 can calculate the current available reserve and compare to the reserve requirement in response to an event trigger generated as a result of processing the current values of the subset of the electrical power grid data. In another embodiment, an economic dispatch (ED) component 430 can generate unit control information in response to an event trigger generated as a result of processing the current values of the subset of the electrical power grid data or during a periodic ED processing cycle.

More generally, any AGC application can be an event-driven component, e.g., AGC components (120, 122, 124), NERC component 410, reserve component 420, ED component 430, etc. Further, any AGC application can determine information in response to an event trigger generated as a result of processing the current values of the subset of the electrical power grid data received from pre-process component 110.

Figure 5:
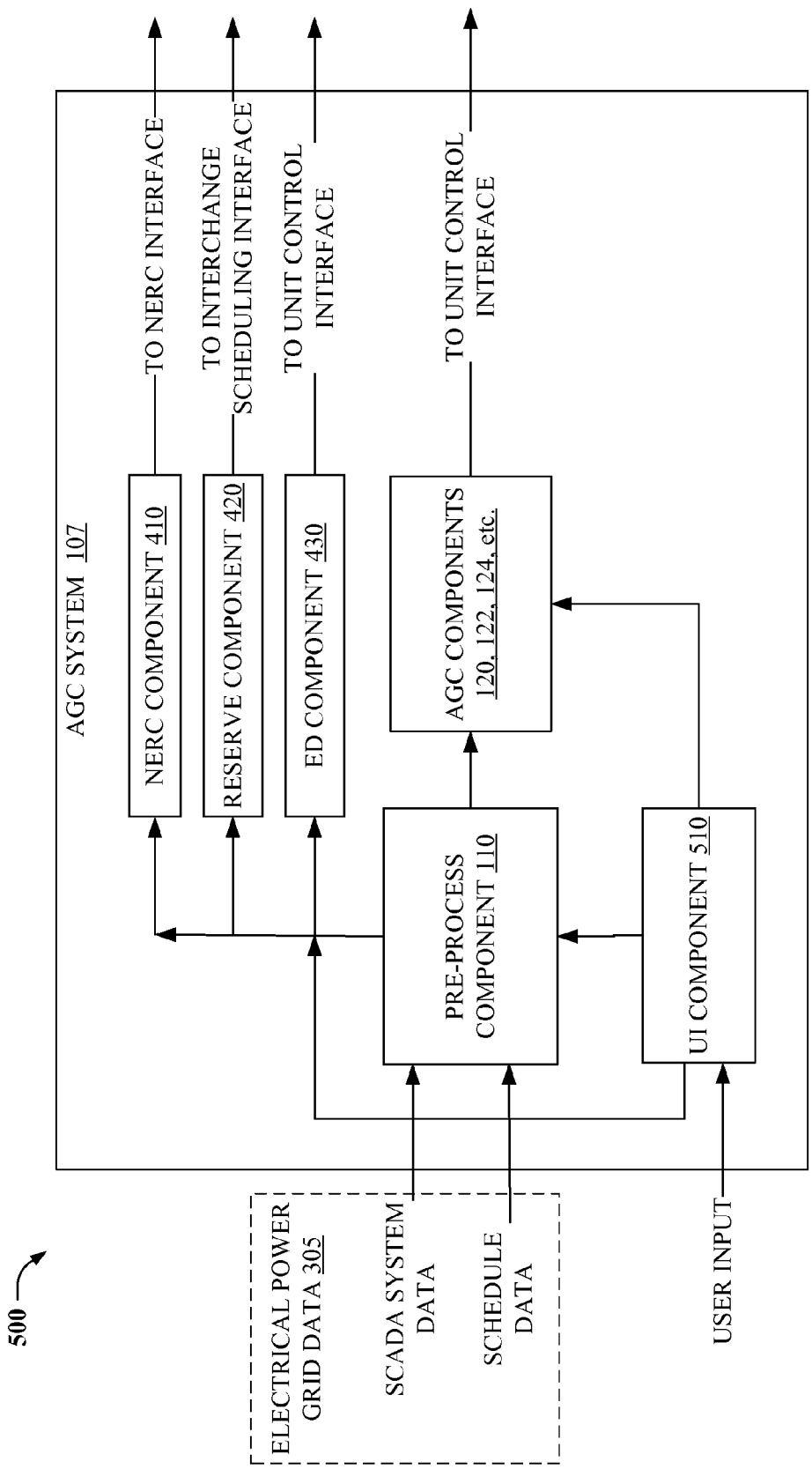
FIG. 5 illustrates a block diagram of an AGC system including a UI component, in accordance with an embodiment.

Referring now to FIG. 5, a block diagram of an AGC infrastructure 500 including a UI component 510 is illustrated, in accordance with an embodiment. UI component 510 can receive input from a user, an operator, etc. that can be used to override, determine, etc. processing, computing, etc. of parameter(s) utilized by respective components described herein, e.g., pre-process component 110, AGC components (120, 122, 124, etc.), NERC component 410, reserve component 420, ED component 430, etc.

Figure 6:
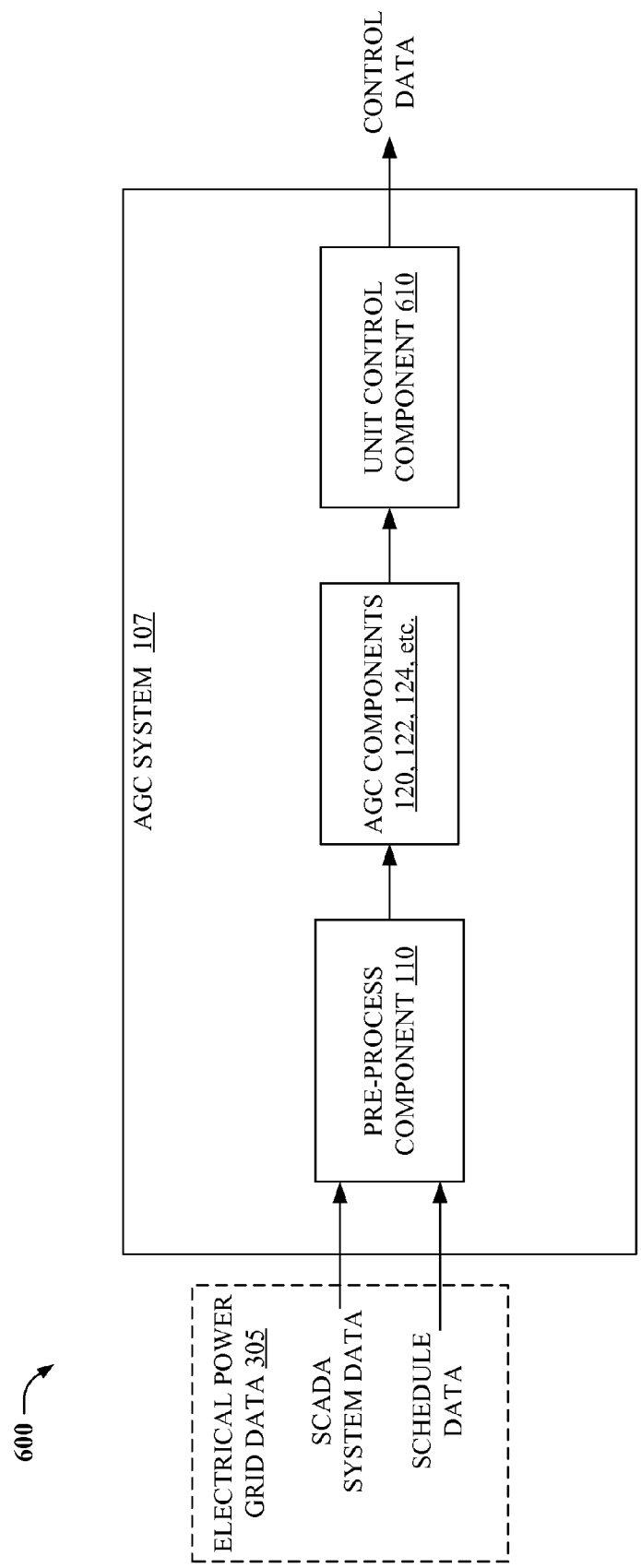
FIG. 6 illustrates a block diagram of an AGC system including a unit control component, in accordance with an embodiment.

FIG. 6 illustrates a block diagram of an AGC infrastructure 600 including unit control component 610, in accordance with an embodiment. Unit control component 610 can control power generator(s) related to electrical power grid 105, based on current values of a subset of electrical power grid data associated with the electrical power grid that has changed since a prior determination of the subset. For example, unit control component 610 can determine, based on output data received from AGC component 120 and the output data from ED component 430, a control action, e.g., whether an incremental change in power (up or down) should occur via change to generating units, change to a controllable load, or change in scheduled power of electrical grid 105. In another embodiment, ED component 430 can utilize a schedule profile, e.g., schedule profile 200 described above, to facilitate scheduling one or more power exchanges between Balancing Authorities across respective tie lines of power grid 105. In this regard, schedule data, representing the power exchange between Balancing Authorities, is received by and processed by the ED component 430, whereby the unit control targets are modified based on output from the ED component 430 to implement the power exchange.

FIGS. 7-10 illustrate various methods in accordance with the disclosed subject matter, e.g., associated with AGC system 107. For simplicity of explanation, the methods are depicted and described as a series of acts. It is to be understood and appreciated that the subject disclosure is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
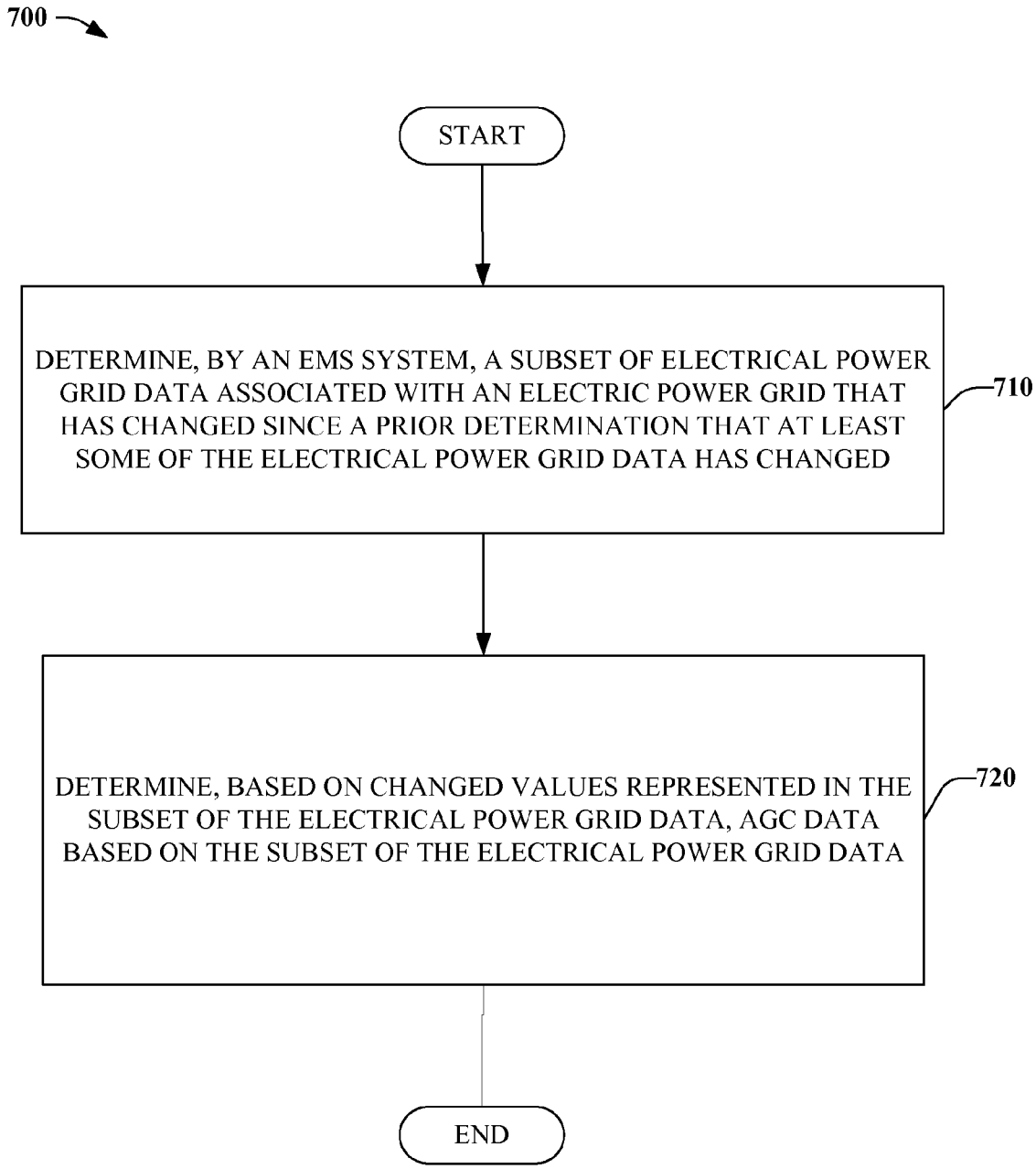
FIGS. 7-10 illustrate various processes associated with one or more AGC infrastructures, in accordance with an embodiment.

Referring now to FIG. 7, a process 700 associated with AGC system 107 is illustrated, in accordance with various embodiments. At 710, an energy management system (EMS), e.g., AGC system 107, can determine a subset of electrical power grid data associated with an electric power grid that has changed since a prior determination that at least some of the electrical power grid data has changed. Further, at 720, the EMS system can determine, based on respective predetermined precision levels applied for respective values of the electrical power grid data, whether a given data point of the electrical power grid data has changed in response to polling a current value of the given data point.

In one embodiment, process 700 can determine, based on respective predetermined magnitudes, precision levels, etc. applied for respective values of the electrical power grid data, whether a given data point of the electrical power grid data has changed in response to polling a current value of the given data point.

In another embodiment, process 700 can determine, based on respective predetermined precision levels applied for respective values of the electrical power grid data, whether a given data point of the electrical power grid data has changed in response to an event that indicates a change in value of the given data point.

Figure 8:
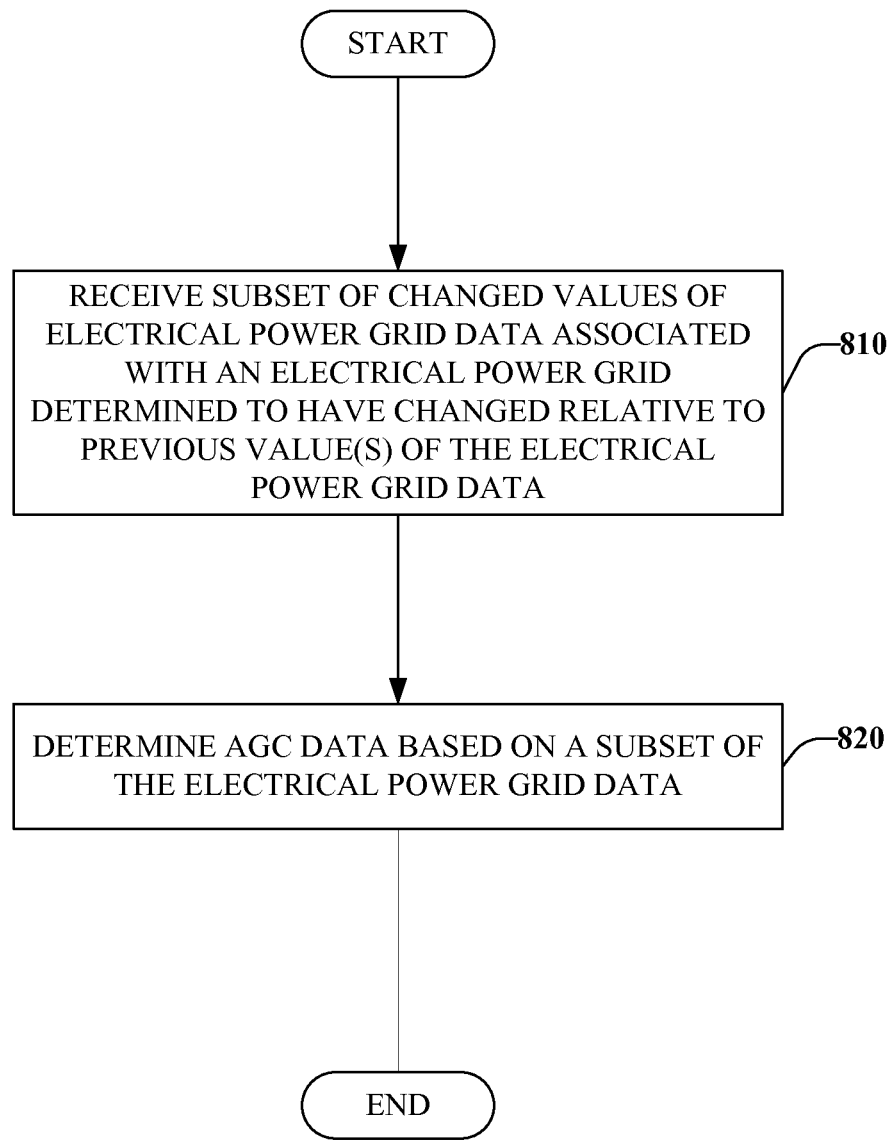
Figure 9:
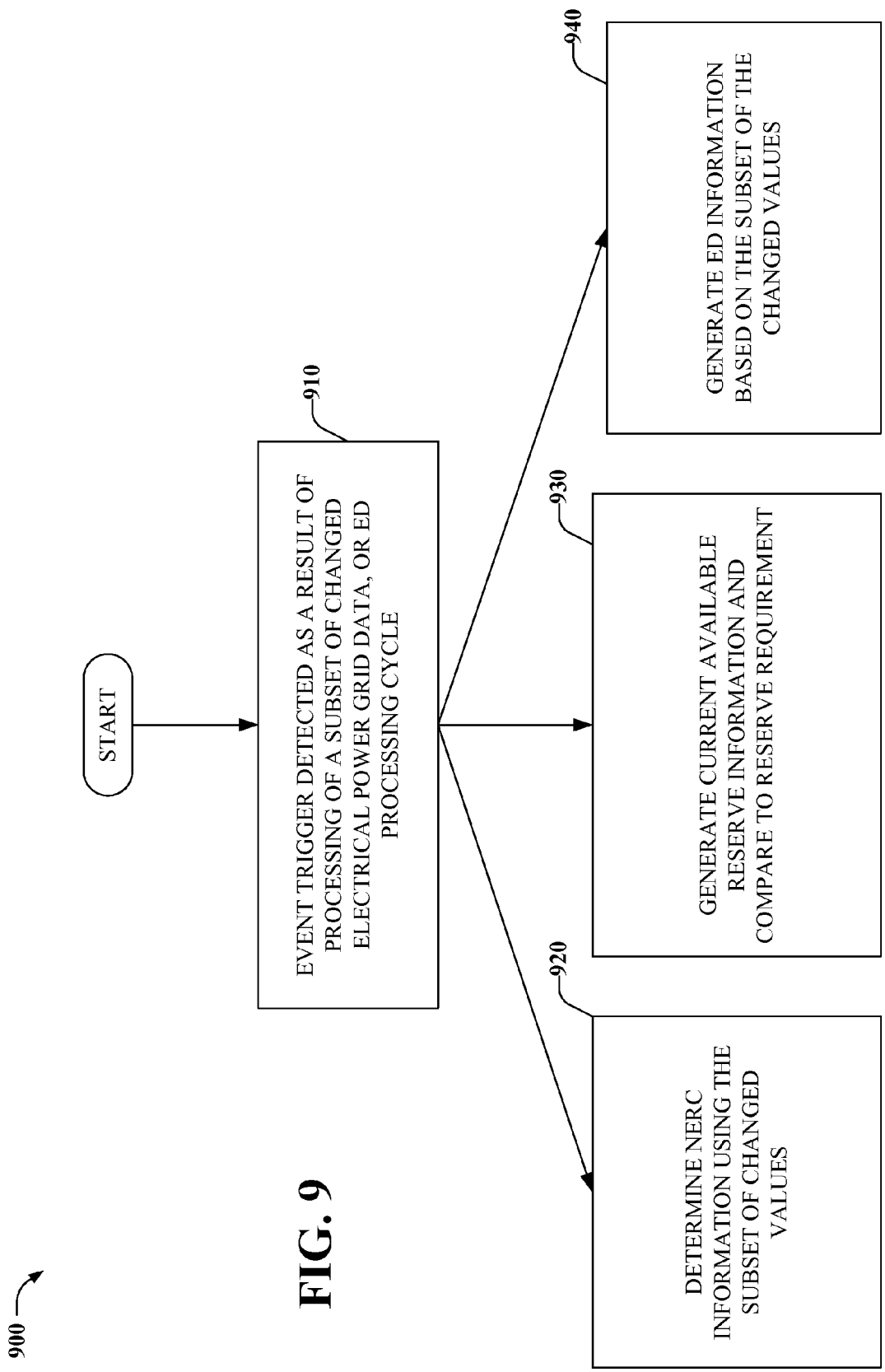

FIGS. 8-9 illustrate processes 800-900, respectively, associated with AGC system 107, in accordance with various embodiments. In one embodiment, process 700 can determine, based on the respective predetermined magnitudes, precision levels, etc. applied for the respective values of the electrical power grid data, that a given data point of the electrical power grid data has changed in response to a new value received for the given data point replacing a previous value.

In another embodiment, process 700 can identify a dependency between a set of calculations to be performed based on at least some of the subset of the electrical power grid data and a dependent set of calculations previously performed by the EMS system, and perform the set of calculations to determine current values and efficiently update a result computed by the EMS system based on the current values of the set of calculations and the previously performed, dependent set of calculations.

In one embodiment, process 700 can receive a change to a data point of a batch of related electrical power grid data points, and delay calculations related to the subset of electrical power grid data for a predetermined period of time to accommodate receipt of a changed data point to the batch of related electrical power grid data points.

FIGS. 8-9 illustrate processes 800 and 900, respectively, associated with AGC system 107, in accordance with various embodiments. At 810, a subset of changed values of electrical power grid data associated with an electrical power grid that were determined to have changed relative to previous value(s) of the electrical power grid data can be received. Further, AGC data can be determined at 820 based on the subset of the changed values of the electrical power grid data, e.g., during cyclical ACE processing cycles.

In one embodiment, process 800 can identify a dependency of a first computation associated with a changed value on a second computation that preceded the first computation. Further, process 800 can compute a result that is affected by the dependency based on the first computation and previously computed values of the second computation, e.g., filtering an output of a sum of power flows of a group of tie lines in response to a change of power flow of a tie line of the group of tie lines. In another embodiment, process 800 can delay a calculation associated with at least a portion of the electrical power grid data, e.g., a sum of power flows of tie lines of a group of tie lines of the electrical power grid, for a predetermined period of time in response to receiving at least one changed value to allow additional values to change related at least some of the portion of the electrical power grid data.

Now referring to FIG. 9, process 900, at 910, can detect an event trigger as a result of processing of a subset of changed electrical power grid data, or engage in a periodic ED processing cycle. Flow continues to 920, 930, and/or 940, e.g., in parallel to AGC data being determined at 820. At 920, NERC information can be determined using the subset of changed values. At 930, current reserve available reserve information can be generated and compared to reserve requirement(s). At 940, ED information can be generated based on the subset of the changed values.

Figure 10:
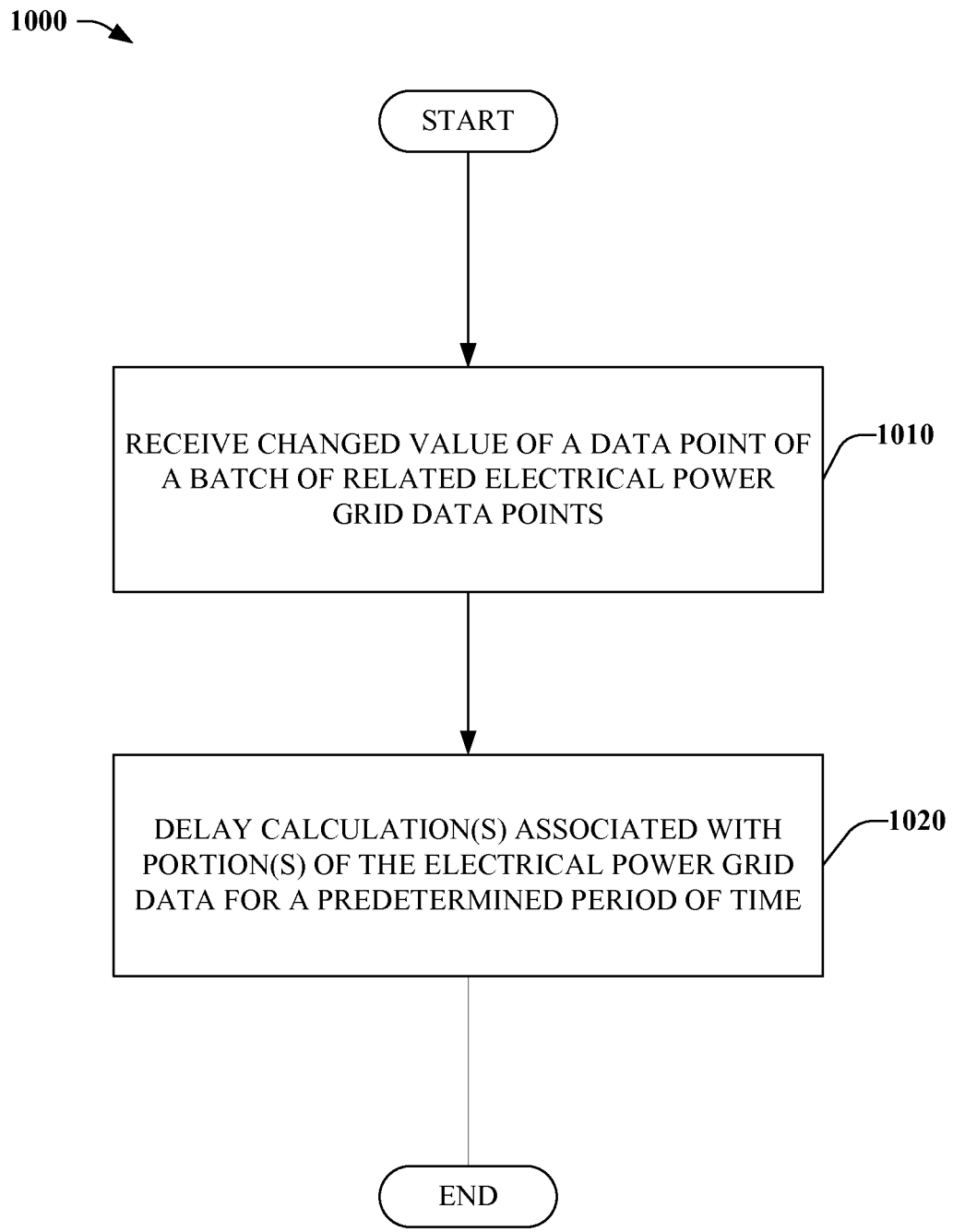

In another embodiment illustrated by FIG. 10, process 1000 can receive a changed value of a data point of a batch of related electrical power grid data points. At 1020, process 1000 can delay calculation(s) associated with portion(s) of the electrical power grid data for a predetermined period of time.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
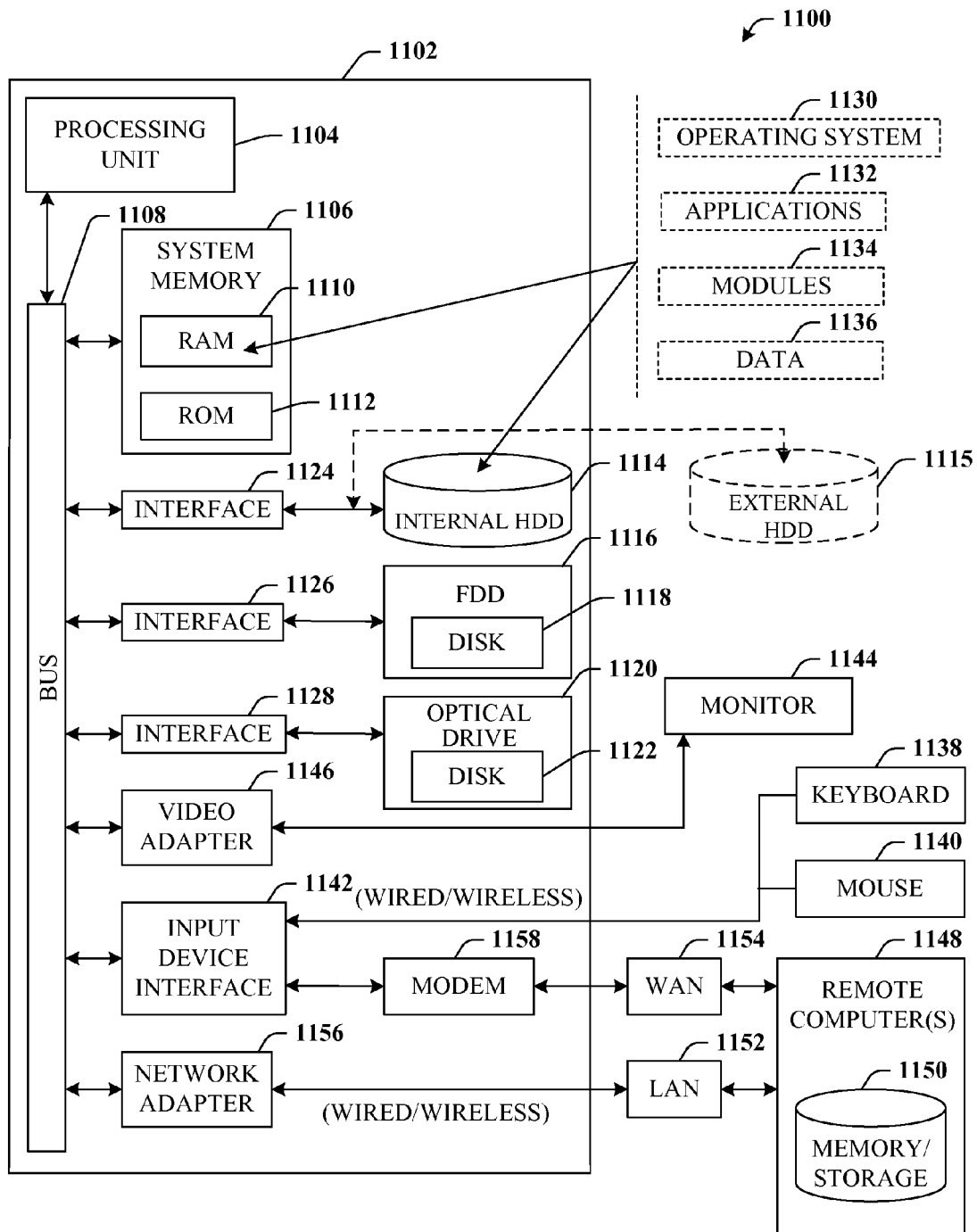
FIG. 11 illustrates a block diagram of a computing system operable to execute the disclosed systems and methods, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented, e.g., various processes associated with FIGS. 1-10. For instance, one or more aspects of AGC system 107 can be implemented in connection with one or more computing systems 1100. While the subject matter has been described above in the general context of computer-executable instructions of a computer program that runs on a computer and/or computers, those skilled in the art will recognize that the subject disclosure also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1102 can include a processing unit 1104, a system memory 1106 and a system bus 1108. The system bus 1108 couples to system components including, but not limited to, the system memory 1106 and the processing unit 1104. The processing unit 1104 can be any of various commercially available processors. Dual microprocessors and other multiprocessor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114, e.g., EIDE, SATA, which internal hard disk drive 1114 may also be configured for external use in a suitable chassis, e.g., 1115, a magnetic floppy disk drive (FDD) 1116, e.g., to read from or write to a removable diskette 1118, and an optical disk drive 1120, e.g., reading a CD-ROM disk 1122 or, to read from or write to other high capacity optical media such as the DVD. The hard disk drive 1114 (or 1115), magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. For example, powerline type communications can allow control nodes of an electrical distribution system to share information. As a second example, cellular type communications can be employed, e.g., as a wireless communications modality disclosed hereinabove. The remote computer(s) 1148 can be a workstation, a server computer, a router, a personal computer, a mobile device, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, e.g., a kiosk, news stand, restroom, etc., and telephone. This includes at least Wi-Fi and Bluetooth™ wireless technologies. Thus, the communication can be a predefined structure as with a conventional network or simply an ad hoc communication between at least two devices.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word— without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via pre-process component 110, to determine a subset of electrical power grid data associated with an electrical power grid that has changed since a prior determination that at least some of the electrical power grid data has changed. Further, the artificial intelligence system can be used, via AGC component 120, to receive current values of the subset of the electrical power grid data from pre-process component 110 and determine AGC output data based on the current values of the subset of the electrical power grid data.

Furthermore, the artificial intelligence system can be used, via analytic component 310, to automatically modify a predetermined period of time to delay a determination of portion(s) of the subset of the electrical power grid data based on an analysis of historical change data associated with the electrical power grid data.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory storing computer-executable components; and
   a processor, communicatively coupled to the memory, that facilitates execution of the computer-executable components, comprising:
   a pre-process component configured to determine a subset of electrical power grid data associated with an electrical power grid that has changed since a prior determination that at least some of the electrical power grid data has changed; and
   an automatic generation control (AGC) application configured to receive current values of the subset of the electrical power grid data from the pre-process component and determine AGC output data based on the current values of the subset of the electrical power grid data, wherein the preprocess component is further configured to delay a calculation of at least part of the subset of the electrical power grid data for a predetermined period of time based on a probability that a batch of changes, which are dependent on at least one of the current values of the subset of the electrical power grid data, will be received within the predetermined period of time.

2. The system of claim 1, wherein the pre-process component is further configured to determine the subset of the electrical power grid data that has changed based on a predetermined precision level with respect to whether a given change for a respective electrical power grid data point constitutes a significant change that is included in the subset or constitutes an insignificant change that is not included in the subset.

3. The system of claim 2, wherein the pre-process component is further configured to determine whether the given change for the respective electrical power grid data point constitutes the significant change or the insignificant change based on an analysis of a predefined number of significant digits for the given change.

4. The system of claim 1, wherein the electrical power grid data indicates at least one of a power flow of a tie line of the electrical power grid, a frequency of the electrical power grid, an output associated with a power source of the electrical power grid, or an output associated with a virtual power plant of the electrical power grid.

5. The system of claim 1, wherein the electrical power grid data indicates at least one of a schedule of tie line power associated with a tie line of the electrical power grid or a schedule of generated power associated with a power source of the electrical power grid.

6. The system of claim 1, wherein the AGC application is further configured to:
in response to identifying a dependency between a set of calculations to be performed by the AGC application based on at least part of the subset of the electrical power grid data and a dependent set of calculations previously performed by the AGC application, performing the set of calculations to determine current values and updating a result computed by the AGC application based on the current values of the set of calculations and values precomputed for the previously performed set of calculations.

7. The system of claim 1, wherein the AGC application is further configured to:
determine a summation of power flows of a group of tie lines of the electrical power grid based on the subset of electrical power grid including a changed value with respect to power flow of a tie line of the group of tie lines; and
based on a dependency of the changed value to previously computed values of the summation, re-compute the summation of power flows for the group based on the changed value and the previously computed values.

8. The system of claim 1, wherein the pre-process component is further configured to, in response receiving a change of an electrical power grid data point of a set of related electrical power grid data points, delay sending the subset of the electrical power grid data to the AGC application for a predetermined period of time to enable a set of changes related to the set of the related electrical power grid data points to be identified by the pre-process component and included in the subset that is sent to the AGC application.

9. The system of claim 1, wherein the AGC component is further configured to delay performing a set of computations based on the subset of the electrical power grid data for a predetermined period of time to enable a set of changes of the electrical power grid data related to the set of computations to be received by the AGC application.

10. The system of claim 1, wherein the pre-process component is further configured to delay a summation of values of the electrical power grid data, the summation including at least one of the current values of the subset of the electrical power grid data being summed.

11. The system of claim 1, wherein the computer-executable components further comprise an analytic component configured to modify the predetermined period of time to delay the calculation of at least the part of the subset of the electrical power grid data based on an analysis of historical change data associated with the electrical power grid data.

12. The system of claim 1, further comprising:
an event-driven component configured to determine information in response to an event trigger generated as a result of processing the current values of the subset of the electrical power grid data received from the pre-process component.

13. The system of claim 1, further comprising:
a North American electric reliability corporation (NERC) component configured to periodically determine NERC information utilizing the current values of the subset of the electrical power grid data.

14. The system of claim 1, further comprising:
a reserve component configured to calculate current available reserve data and compare the current available reserve data to a reserve requirement in response to an event trigger generated as a result of processing the current values of the subset of the electrical power grid data.

15. The system of claim 1, further comprising:
an economic dispatch (ED) component configured to generate unit control information in response to an event trigger generated as a result of processing the current values of the subset of the electrical power grid data or during a periodic ED processing cycle.

16. The system of claim 1, wherein the electrical power grid data includes supervisory control and data acquisition (SCADA) data associated with the electrical power grid.

17. A method, comprising:
determining, by an energy management system (EMS) including at least one processor, a subset of electrical power grid data associated with an electrical power grid that has changed since a prior determination at least some of the electrical power grid data has changed;
based on changed values represented in the subset of the electrical power grid data, determining automatic generation control (AGC) data based on the subset of the electrical power grid data; and
delaying a determination of one or more portions of the subset of the electrical power grid data for a defined period of time based on a probability that a batch of changes that are dependent on a current value of the subset of the electrical power grid data will be received within the defined period of time.

18. The method of claim 17, wherein the determining the subset of the electrical power grid data that has changed further includes:
determining, based on respective predetermined precision levels applied for respective values of the electrical power grid data, whether a given data point of the electrical power grid data has changed in response to polling a current value of the given data point.

19. The method of claim 17, wherein the determining the subset of the electrical power grid data that has changed further includes:
  determining, based on respective predetermined precision levels applied for respective values of the electrical power grid data, whether a given data point of the electrical power grid data has changed in response to an event that indicates a change in value of the given data point.

20. The method of claim 17, wherein the determining the subset of the electrical power grid data that has changed further includes:
  determining, based on respective predetermined precision levels applied for respective values of the electrical power grid data, that a given data point of the electrical power grid data has changed in response to a new value received for the given data point replacing a previous value.

21. The method of claim 20, wherein the determining that the given data point of the electrical power grid data has changed further includes:
  in response to identifying a dependency between a set of calculations to be performed based on at least some of the subset of the electrical power grid data and a dependent set of calculations previously performed by the EMS, performing the set of calculations to determine current values of the set of calculations and update a result computed by the EMS based on the current values of the set of calculations and the previously performed, dependent set of calculations.

22. The method of claim 17, wherein the processing further includes:
  in response to receiving a change to a data point corresponding to the batch of changes, delaying calculations related to the subset of electrical power grid data for the predetermined period of time.

23. A non-transitory computer-readable storage medium comprising instructions that, in response to execution, cause a system including at least one processor to perform operations, comprising:
  receiving a subset of changed values of electrical power grid data associated with an electrical power grid determined to have changed relative to previous values of the electrical power grid data;
  based on the receiving the subset of the changed values, determining automatic generation control (AGC) data based on a subset of the electrical power grid data; and
  postponing a determination of at least a portion of the subset of the changed values of the electrical power grid data for a predetermined period of time based on a probability that a batch of changes that are dependent on a current value of the subset of the electrical power grid data will be received within the predetermined period of time.

24. The computer-readable storage medium of claim 23, wherein the determining the AGC data further includes:
  in response to identifying a dependency of a first computation associated with a changed value of the changed values on a second computation that preceded the first computation, computing a result that is affected by the dependency based on the first computation and previously computed values of the second computation.

25. The computer-readable storage medium of claim 23, wherein the operations further comprise in response to an event trigger generated as a result of processing the subset of the changed values or during a periodic ED processing cycle, at least one of:
  determining North American electric reliability corporation (NERC) information utilizing the subset of the changed values;
  generating current available reserve information and comparing the current available reserve information to a reserve requirement; or
  generating economic dispatch (ED) information based on the subset of the changed values.

26. The computer-readable storage medium of claim 23, wherein the operations further comprise:
  delaying calculations associated with a second portion of the electrical power grid data in response to receiving a changed value of a data point of related electrical power grid data points.

* * * * *